(12) United States Patent
Fontanez et al.

(10) Patent No.: US 10,016,740 B2
(45) Date of Patent: Jul. 10, 2018

(54) TIN DIOXIDE NANOPARTICLES SYNTHESIS APPARATUS AND TIN DIOXIDE NANOPARTICLES PROCESS PRODUCTION

(71) Applicant: Faculdades Católicas, Associação sem fins lucrativos, Mantenedora da Pontifícia Universidade Católica, Rio de Janeiro (BR)

(72) Inventors: Diego Manuel Ferreira Lusquinos Fontanez, Rio de Janeiro (BR); Francisco Jose Moura, Rio de Janeiro (BR)

(73) Assignee: Faculdades Católicas, Associação sem fins lucrativos, Mantenedora da Pontificia Universidade Católica, Rio de Janeiro (BR)

( * ) Notice: Subject to any disclaimer, the term of this patent is extended or adjusted under 35 U.S.C. 154(b) by 0 days.

(21) Appl. No.: 15/410,293

(22) Filed: Jan. 19, 2017

(65) Prior Publication Data
US 2017/0189878 A1    Jul. 6, 2017

Related U.S. Application Data

(63) Continuation-in-part of application No. 14/398,903, filed as application No. PCT/BR2013/000147 on May 6, 2013, now abandoned.

(30) Foreign Application Priority Data

May 4, 2012  (BR) .......................... 1020120106663

(51) Int. Cl.
*B01J 12/00* (2006.01)
*B01J 12/02* (2006.01)
(Continued)

(52) U.S. Cl.
CPC ............. *B01J 12/02* (2013.01); *B01J 19/006* (2013.01); *B01J 19/2415* (2013.01);
(Continued)

(58) Field of Classification Search
CPC ... B01J 12/00; B01J 12/02; B01J 19/00; B01J 19/0053; B01J 19/006; B01J 19/02;
(Continued)

(56) References Cited

U.S. PATENT DOCUMENTS 3,876,259 A * 4/1975 Gunderson ............ B65G 53/58
                                                            406/93
2010/0294728 A1   11/2010 Asgharnejad

FOREIGN PATENT DOCUMENTS

| EP | 0755902 A2 | 1/1997 |
| JP | 2010015783 A | 1/2001 |
| JP | 2008069071 A | 3/2008 |

OTHER PUBLICATIONS

Kockman et al., Sensors and Actuators B 117, 2006, 495-508.*
(Continued)

*Primary Examiner* — Natasha E Young
(74) *Attorney, Agent, or Firm* — Laurence P. Colton; Smith Tempel Blaha LLC

(57) ABSTRACT

A new and efficient nanoparticles synthesis apparatus and process production. More particularly, an apparatus and process applied to the synthesis of nanostructured tin dioxide. The benefits provided by the apparatus and process are applied in various gaseous reactions where occurs the formation of solid and gaseous products.

10 Claims, 12 Drawing Sheets

(51) Int. Cl.
  *B01J 19/00* (2006.01)
  *B01J 19/02* (2006.01)
  *B01J 19/24* (2006.01)
  *C01G 19/02* (2006.01)

(52) U.S. Cl.
  CPC ..... *C01G 19/02* (2013.01); *B01J 2219/00763* (2013.01); *B01J 2219/24* (2013.01)

(58) Field of Classification Search
  CPC .................. B01J 19/24; B01J 19/2415; B01J 2219/00763; B01J 2219/24
  See application file for complete search history.

(56) References Cited

OTHER PUBLICATIONS

Maciel et al., "Nanostructured Tin Dioxide Synthesis and Growth of Nanocrystals and Nanobelts", New Quim (26) 6, 855-862 (2003).

Maciel et al., "Nanostructured Tin Dioxide as a NOx Gas Sensor", Ceramics 49, 163-167 (2003).

Chung et al., "Design and Experiments of a Short-Mixing-Length Baffled Microreactor and its Application to Microfluidic Synthesis of Nanoparticles", Chemical Engineering Journal, 168.2, pp. 790-798 (2011).

Gao et al., "Sunthesis of SnO2 Nanocrystals by Solid State Reaction Followed by Calcination", China Particuology, vol. 2, No. 4, pp. 177-181 (2004).

\* cited by examiner

TIN DIOXIDE NANOPARTICLES SYNTHESIS APPARATUS AND TIN DIOXIDE NANOPARTICLES PROCESS PRODUCTION

STATEMENT OF RELATED APPLICATIONS

This application claims the benefit of U.S. patent application Ser. No. 14/398,903, now US 20150139894 A1, filed Nov. 4, 2014, which claims the benefit of priority to PCT/BR2013/000147, now WO 2013/163710, filed May 6, 2013, which claims priority to Brazilian Patent No. BR1020120106663, filed May 4, 2012, the entire contents of which are incorporated herein by reference.

BACKGROUND OF THE INVENTION

1. Field of the Invention

The following invention relates to a new and efficient nanoparticles synthesis apparatus and process production. More particularly, the present invention is applied to the synthesis of nanostructured tin dioxide. The benefits provided by the invention are revealed in various gaseous reactions where occurs the formation of solid and gaseous products.

2. Related Art

The nanostructured tin dioxide has properties such as high electrical conductivity, high transparency in the UV-visible region, high thermal resistance, mechanical and chemical resistance and has many applications through microelectronics, manufacturing of opto-electronic devices, solar cells, catalysts, gas sensors, among others. Its major application is in gas sensors production.

Various methods and reactors for the synthesis of tin dioxide are described in the literature, such as the sol-gel method, hydrothermal synthesis, etc. But these methods have limitations that prevent them from being implemented on an industrial scale, such as difficulties in control parameters, high energy cost, complexity, process cost, and generate dangerous co-products, which usually means difficult maintenance and disposal.

The scientific literature and patent research points out some prior art documents related to the present invention. The following paper, Maciel et al., "Nanostructured Tin Dioxide Synthesis and Growth of Nanocrystals and Nanobelts" (New Quim (26) 6, 855-862 (2003)) describes the synthesis of nanostructures of tin dioxide through a solution of supersaturated solid in a process of growth of $SnO_2$ nanoribbons through carbothermal reduction at temperatures ranging from 1100° C. to 1200° C. Another scientific article, Maciel et al., "Nanostructured Tin Dioxide as a NOx Gas Sensor" (Ceramics 49, 163-167 (2003)) describes a process for obtaining nanoparticles of tin dioxide from the dissolved tin citrate, and subsequently particularization of the material obtained. The present invention differs from these documents, for it does not consist of a supersaturated solid solution reaction at high temperatures. The present invention is based on a single process through a gas reaction, using such apparatus at low temperatures (around 200° C.).

The US2010/0294728 document describes a production method of zinc oxide and/or tin dioxide nanoparticles using NaOH. The method comprises the steps of a) selecting a compound from a group of oxides (ZnO, or $SnO_2$); b) making a solution with the base material of these oxides ($ZnSO_4$ or $SnCl_4$); c) dissolving this solution with distilled water; d) mixing the solution obtained; e) adding the NaOH solution until there is formation of a white precipitate; f) pH control and stirring the solution; g) filtering the solution to obtain a precipitate separately; h) drying the sediment; and i) calcifying the precipitate. The present invention differs from this document, for it comprises an apparatus for the production of tin dioxide in the form of nanoparticles and a process for the production of tin dioxide in the form of nanoparticles using such apparatus, which was not described nor suggested in that document.

What is evident from the literature mentioned herein is that no documents were found suggesting or anticipating the teachings of the present invention, so that the solution proposed here possesses novelty and inventive activity against the prior art.

BRIEF SUMMARY OF THE INVENTION

The present invention provides an apparatus and method for the production of nanoparticles of tin dioxide in a single process. The process of the present invention comprises a simple reaction, at relatively low temperatures (about 200° C.) in a continuous flow system. Thus, the present invention provides a new and inventive apparatus for carrying out the said process with high energy efficiency achieved with low reaction temperature, relatively fast production obtained through increased kinetics, process simplicity and low crystallite size, essential for the quality of the gas sensor made from this material. However the benefits of this equipment is generally applicable to other gaseous reactions, not only to the synthesis reaction of tin dioxide described.

One of the main advantages of the present invention is to provide an apparatus which presents a novel and inventive way of interaction between the reagents, in which the flow of water vapor is distributed by small holes surrounding the tubular reactor. Meanwhile the reaction gas, preferably tin tetrachloride, passes through this tubular reactor.

The present invention provides a tin dioxide nanoparticles synthesis apparatus whose initial concept was based on a simple synthesis reaction using tin tetrachloride and water, both in vapor form, generating tin dioxide nanoparticles and hydrochloric acid. Nevertheless, this process can be applied to various types of gas where there are reactions and other solid forming gas.

The apparatus according to the present invention consists of a tubular reactor surrounded by small holes therethrough that allows the passage of the water vapor stream into the tubular reactor. Thus, the water vapor flowing through the small holes is introduced radially and in certain embodiments perpendicularly into the tubular reactor and relative to the reaction gas flowing in the tubular reactor. The perpendicular collision between the water vapor flowing through the holes and the reaction gas, preferably tetrachloride, that enters the tube favors the reaction kinetics and its yield, and can be performed at relatively low temperatures compared to other methods of synthesis. Moreover, this reaction has industrial application, as can be seen in the industrial production process cited in the present invention. Further, the formed hydrochloric acid, HCl, can be reused to produce more tin tetrachloride or even be sold.

This new configuration allows a kinetically more favorable interaction between the reagents. The collisions between the molecules of water and the gas molecules, preferably $SnCl_4$, occur more energetically when the gas flow collides with the curtain of water vapor created by the distributor than when the $SnCl_4$ finds a more stable atmosphere of water vapor. The increased reaction kinetics was confirmed by comparison with other reactors and, using the apparatus of the present invention, the reaction occurred at lower temperature and in less time than in prior art reactors.

It is therefore an object of the present invention to provide an apparatus for the synthesis of nanoparticles comprising:
a) means for radial interaction between the flows of reagents;
b) means to optimize the flow of continuous water vapor around the reactor where the reagent passes; and
c) means for heating the reactor, allowing the reaction:

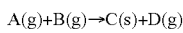

In a preferred implementation, the present invention provides the reduction of particle size of the synthesized solid; optimization of the yield of the solid production; and decrease of the reaction temperature and/or reaction time.

In a preferred implementation, the apparatus described above is used for the tin dioxide nanoparticles synthesis ($SnO_2$).

In a preferred implementation, $A(g)=SnCl_4(g)$; $B(g)=2H_2O(g)$; $C(s)=SnO_2$; and $D(g)=4HCl(g)$.

In a preferred implementation, the reaction temperature is about 200° C.

It is also an additional object of the present invention the process of producing nanoparticles comprising the steps of:
a) allow radial interaction between flows of reagents;
b) optimize the flow of water vapor around the reactor where the reagent passes; and
c) heating the reactor, therefore allowing the reaction:

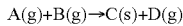

These and other objects of the invention will be immediately appreciated by those skilled in the art and by companies of the segment, and will be described below with sufficient detail for its perfect reproduction.

BRIEF DESCRIPTION OF THE FIGURES

The attached figures represent illustrative and schematic illustrations and of the present invention, which has no bearing to restrict or limit the scope or the reach of the invention. The mentioned figures represent.

DETAILED DESCRIPTION OF PREFERRED EMBODIMENTS

Figure 1:
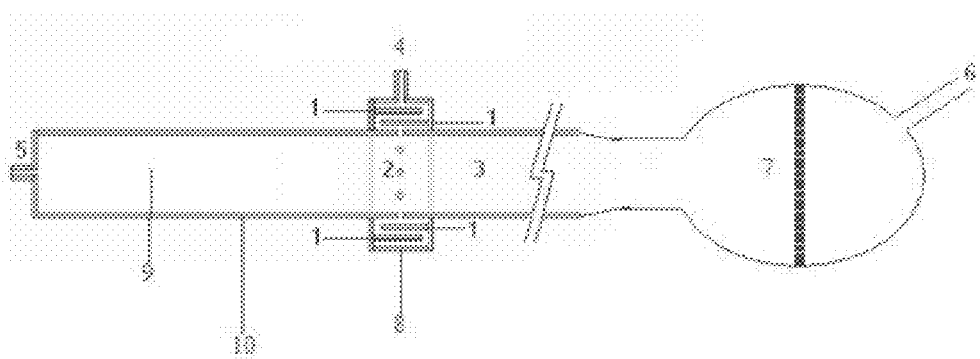
FIG. 1 shows a tubular reactor provided with the gas distributor.
Figure 2:
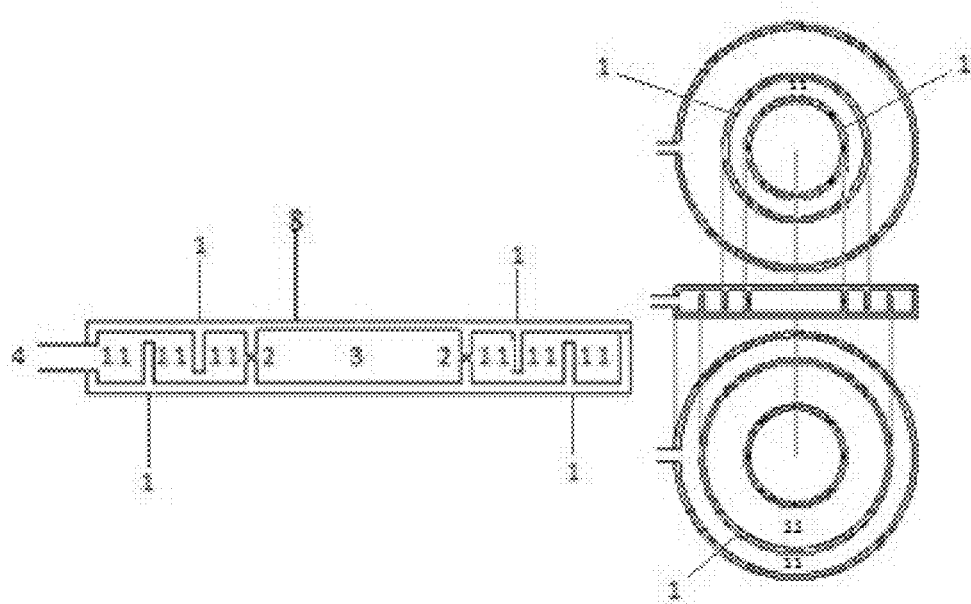
FIG. 2 shows a detailed gas distributor.

The following is the detailed description of a preferred application of the present invention, which has no bearing to restrict or limit the scope or the reach of the invention.

The reactor of the present invention is illustrated in FIGS. 1, 2, 11, and 12. In the reactor 10 of the present invention the flow of tin tetrachloride and water vapor meet radially, in order to maximize the probability of contact and the energy involved in the collision between them. The water vapor enters trough the inlet 4 located at the gas distributor 8, while the tetrachloride enters parallel to the axis of the tubular reactor 9 through the inlet 5. The tubular section 9 is provided with the distributor, built in a way that the water vapor flow is and the carrier gas passes through the cylindrical baffles 1 redirecting part of the mixture (water vapor and carrier gas) from the outer canals located at the outer section 11 to the inner canals located at the inner section 11 created by the cylindrical baffles into the lower orifices or holes 2 of the reactor (tube) 9. Thus, the mixture (water vapor and the carrier gas) is distributed evenly over the orifices or holes 2 of the tubular section 9, and then radially meet the tin tetrachloride flow.

Figure 6:
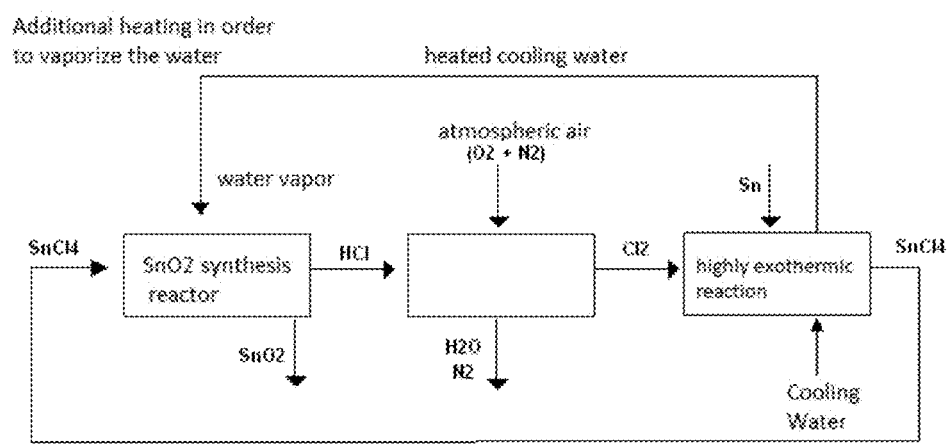
FIG. 6 shows a simplified schematic of industrial production using the present invention apparatus and process.

This energetic radial contact between the reagents creates a highly efficient mixture and starts the reaction that occurs rapidly along a short extension of the tube (region 3) wherein the temperature is maintained at 200° C. The tin dioxide nanoparticles are collected in the powder collector 7 located shortly after the gas distributor while the hydrogen chloride gas produced along with other gases leave the reactor 6 for subsequent treatment or reuse on the industrial production scheme as shown in FIG. 6.

Figure 11:
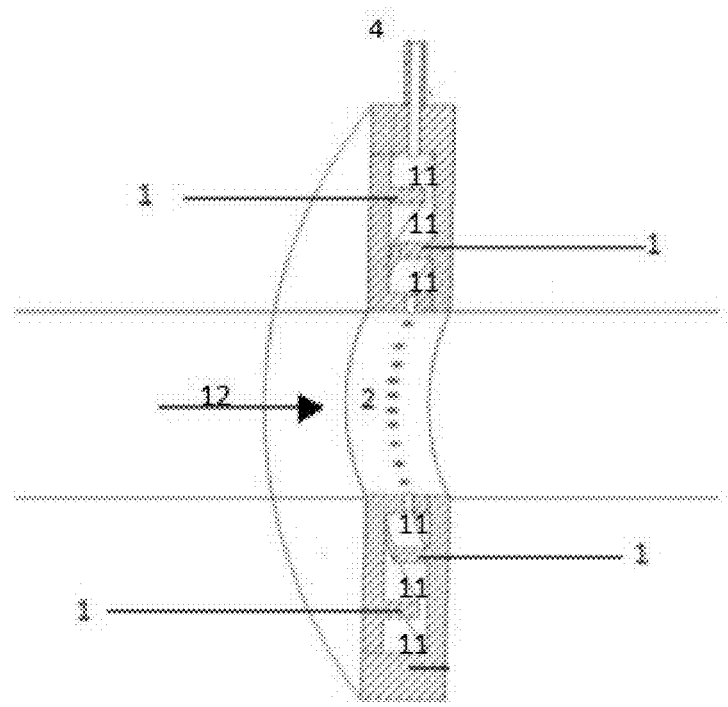
FIG. 11 shows a detailed gas distributor, perspective view.
Figure 12:
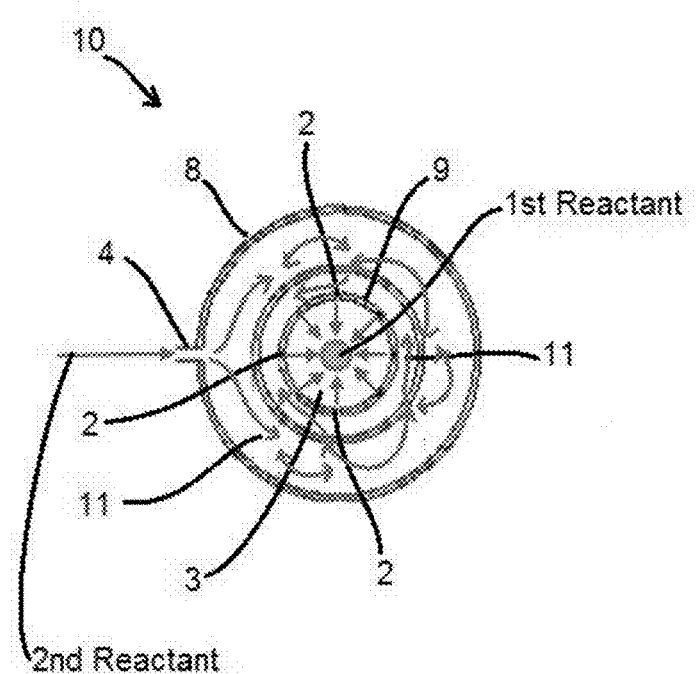
FIG. 12 shows a top schematic view of the reactor showing an illustrative or example reactant flow of two reactants through the reactor.

The perspective view of the gas distributor is shown in FIG. 11. The cylindrical baffles 1 create flow canals 11 inside the gas distributor where one of the reactants will flow from the outer canals to the inner canals until it reaches the orifices 2 and meets the other gaseous flow 12 radially. The reactant enters the gas distributor through the inlet 4. A schematic view of the reactor showing an illustrative or example reactant flow of two reactants through the reactor 10 is shown in FIG. 12, with a second reactant flowing over and under cylindrical baffles 1, through flow canals 11, and radially interacting with a first reactant in region 3 of tubular reactor 9.

Tetrachloride and the water, in the liquid phase at room temperature, are volatilized through heater blankets. Then argon is used as a carrier gas to bring these reagents to the reactor gas. The heating of the reactor is done via heaters installed along the tube.

Figure 9:
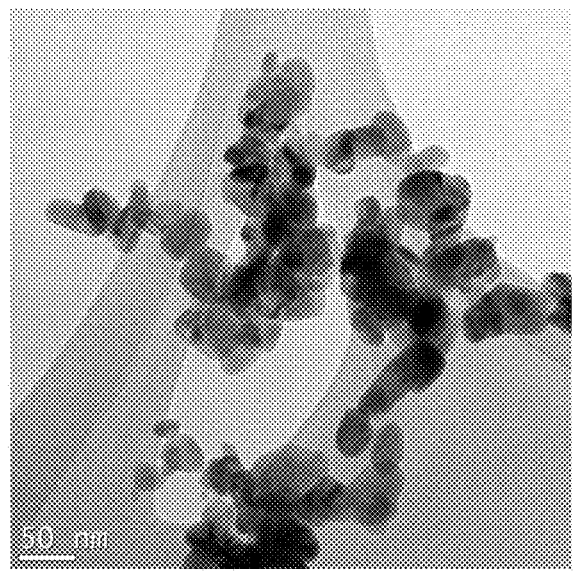
FIG. 9 shows a high-resolution transmission electron microscopy (HRTEM) of the sample produced by the current state of technique. Scale: 50 nm.
Figure 10:
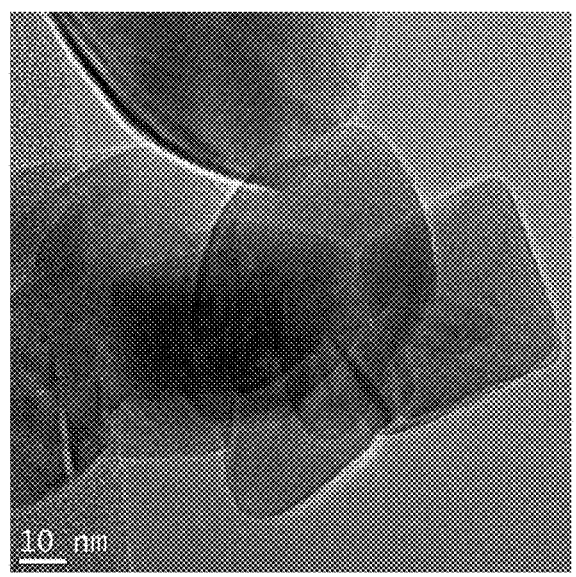
FIG. 10 shows a high-resolution transmission electron microscopy (HRTEM) of the sample produced by the current state of technique. Scale: 10 nm.

Experiments carried out by the above methods, but using a traditional apparatus and reactor, produced tin dioxide nanoparticles sizes ranging from 25-45 nm, shown by the TEM images (FIGS. 9 and 10). In these early experiments the reagent flows were parallel; however, in the present invention, the flows are conducted perpendicularly, radially about the flowing reactant gas, allowing a kinetically more favorable interaction between the reagents. This was proven by the lower temperature required for the completion of the reaction. The reaction temperature decreased from 700° C. to 200° C. using the present invention.

Figure 3:
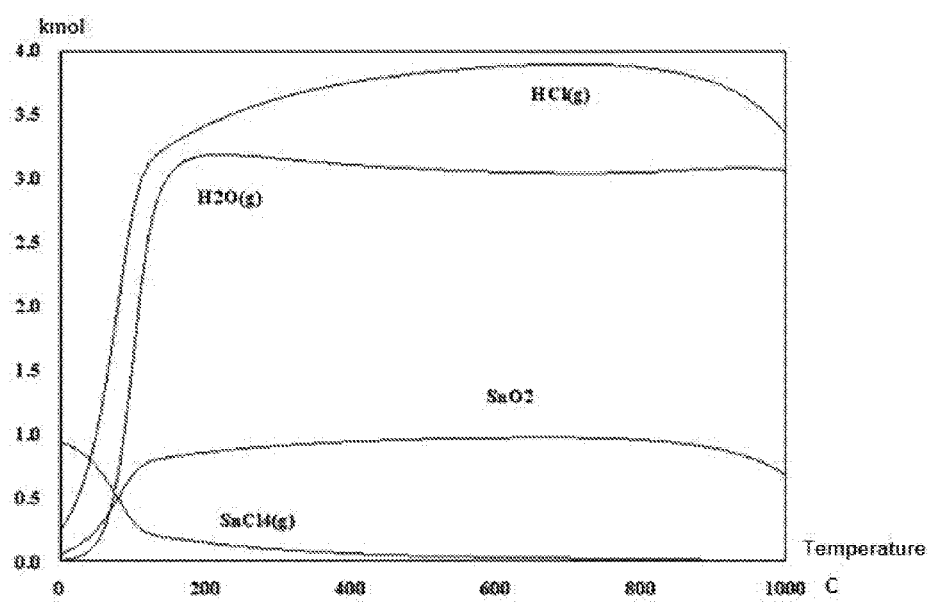
FIG. 3 shows an equilibrium versus temperature composition of the synthesis reaction.

FIG. 3 shows the equilibrium composition versus temperature graph of the synthesis reaction, built from HSC Chemistry®. 5 kmol $H_2O$ (g) and 1 kmol of $SnCl_4$ (g) were calculated. Importantly, program calculations are based on closed systems. As the process of the present invention is an open system, we expect a higher conversion at lower temperatures, as evidenced in the experiments presented here, thus increasing the viability of the inventive process.

The results shown here were obtained through analysis of tin dioxide samples collected at the end of the reactor and the powder filter. The following are the parameters and test results, to the date, more satisfactory.

Figure 4:
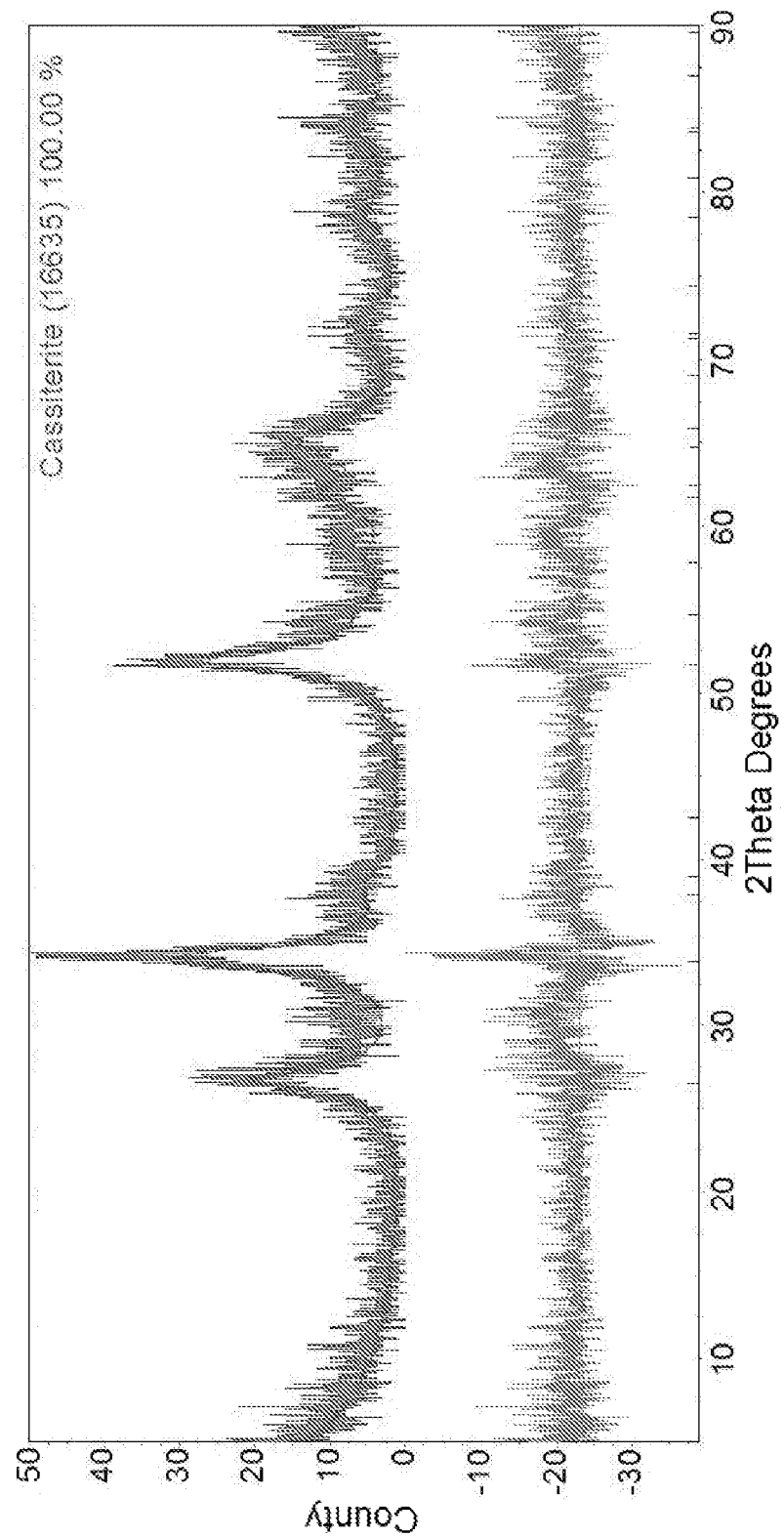
FIG. 4 shows an XRD of a $SnO_2$ sample synthesized through the present invention.
Figure 5:
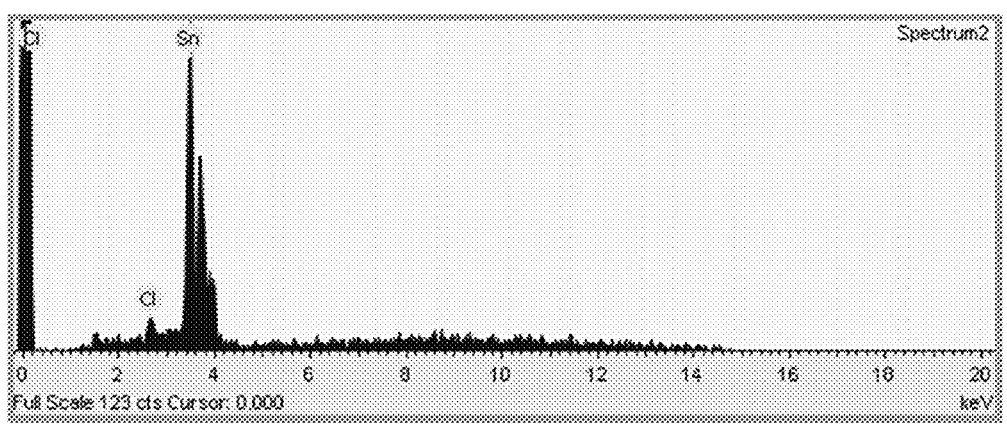
FIG. 5 shows an EDS of a $SnO_2$ sample synthesized through the present invention.

The $SnO_2$ produced was analyzed using EDS (energy dispersive spectroscopy) and XRD (X-ray Diffraction). The crystallite size calculated using the XRD shown in FIG. 4 was approximately 3 nm. This crystallite size is much smaller than the 45 nm calculated from the gaseous reaction using a traditional reactor. The quality of the nanostructured tin dioxide gas sensor strongly improves with the decrease of particle size. The present invention apparatus also allows the reaction temperature reduction from 700° C. to 200° C. The EDS of the sample (FIG. 5) shows the strong presence of tin, confirming the purity of the sample and the high rate of conversion of the reaction system.

FIG. 6 illustrates a simplified diagram of an industrial $SnO_2$ nanoparticles production. The first reactor performs the $SnO_2$ synthesis, receiving the reagents $SnCl_4$ and water vapor. The $SnO_2$ is collected and the co-product of this reaction, the gaseous HCl, is taken to the second reactor. The reactor for generation of $Cl_2$ receives atmospheric air, whose oxygen reacts with HCl to form water, which is discarded, and chlorine gas ($Cl_2$) according to the reaction:

$$4HCl_{(g)} + O_{2(g)} = 2H_2O + 2Cl_{2(g)}$$

Figure 7:
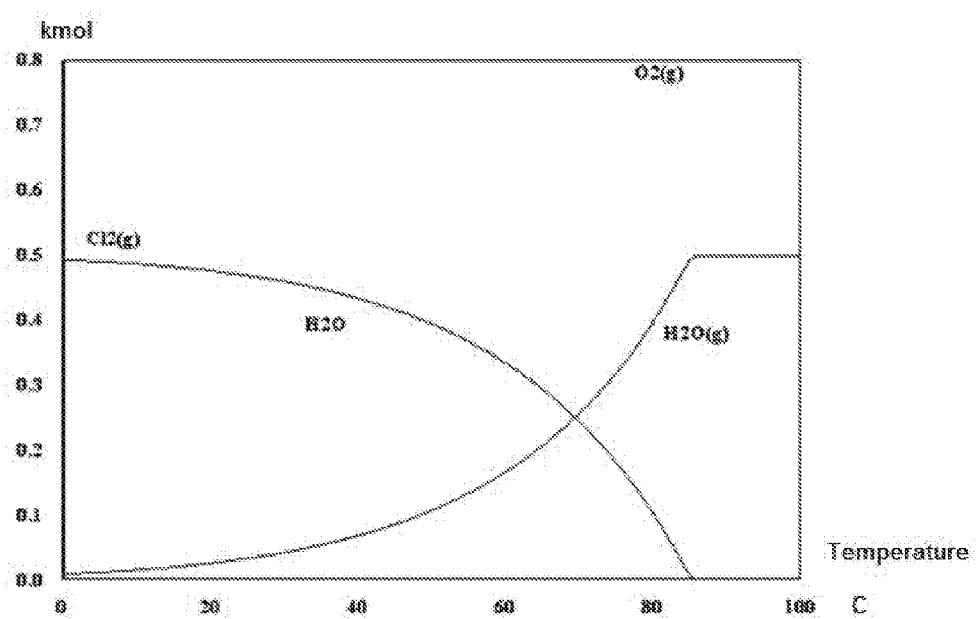
FIG. 7 shows an equilibrium versus temperature composition of the $Cl_2$ production reaction shown in the simplified schematic of industrial production.

The thermodynamic study shown in FIG. 7 points toward almost 100% conversion at low temperatures (room temperature), contributing to the viability of the energy cost. 1 kmol of HCl (g) and 2 kmol $O_2$ (g) were calculated. In this case the reaction is also gaseous, and the interaction between the reactants is crucial. Therefore, a reactor equivalent to the one used for the $SnO_2$ synthesis also present benefits being used in the generation of $Cl_2$.

However, it should be noted that reactions involving hydrochloric acid are complicated due to waste of materials and environmental damage. If it is not of interest to perform the chlorination of tin for producing tin tetrachloride, the HCl itself is already a salable product. So, it is possible to collect the HCl right after the first reactor.

Again it is important to remember that the program used for thermodynamic studies performs its calculations based on a closed system. As shown by the results of experimental line, the practical results were thermodynamically more promising than the theoretical. The satisfactory theoretical calculations presented here for the industrial system are an indication that the same may occur at larger scales and in other reactions, since they also occur in open systems. Table 1 below shows the thermodynamic data of the $Cl_2$ synthesis reaction at different temperatures.

TABLE 1 thermodynamic data of the $Cl_2$ synthesis reaction at different temperatures.
4HCl(g) + O2(g) = 2H2O + 2Cl2(g)

| T C | deltaH kcal | deltaS cal/K | deltaG kcal | K | Log(K) |
|---|---|---|---|---|---|
| 0.000 | −51.678 | −99.649 | −24.459 | 3.726E+019 | 19.571 |
| 100.000 | −47.049 | −83.665 | −15.830 | 1.871E+009 | 9.272 |
| 200.000 | −45.134 | −79.130 | −7.694 | 3.583E+003 | 3.554 |
| 300.000 | −42.720 | −74.526 | −0.005 | 1.004E+000 | 0.002 |
| 400.000 | −39.092 | −68.705 | 7.156 | 4.746E−003 | −2.324 |
| 500.000 | −35.388 | −63.573 | 13.764 | 1.285E−004 | −3.891 |
| 600.000 | −31.740 | −59.136 | 19.894 | 1.047E−005 | −4.980 |

TABLE 1-continued thermodynamic data of the $Cl_2$ synthesis reaction at different temperatures.
4HCl(g) + O2(g) = 2H2O + 2Cl2(g)

| T C | deltaH kcal | deltaS cal/K | deltaG kcal | K | Log(K) |
|---|---|---|---|---|---|
| 700.000 | −28.156 | −55.249 | 25.609 | 1.771E−006 | −5.752 |
| 800.000 | −24.630 | −51.799 | 30.958 | 4.951E−007 | −6.305 |
| 900.000 | −21.159 | −48.706 | 35.981 | 1.979E−007 | −6.704 |
| 1000.000 | −17.738 | −45.908 | 40.709 | 1.026E−007 | −6.989 |

The $Cl_2$ generated is then transported to the third reactor, which also receives metallic tin in order to react with the $Cl_2$, producing the $SnCl_4$ required for the $SnO_2$ synthesis reaction in the first reactor. The chlorination of tin is highly exothermic, requiring the cooling of the reactor in order to achieve a higher yield. Thus water is used, which in addition to performing the cooling of the third reactor, uses the energy of chlorination to be vaporized and reacted with $SnCl_4$ in the first reactor.

Figure 8:
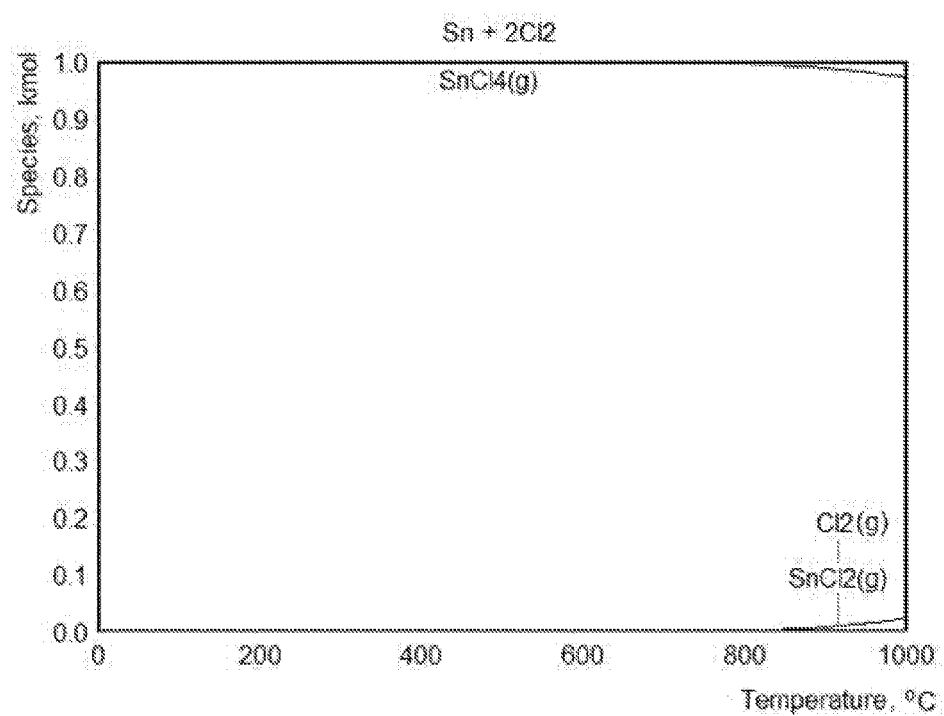
FIG. 8 shows an equilibrium composition versus temperature composition of the Sn chlorination reaction shown in the simplified schematic of industrial production.

FIG. 8 shows the thermodynamic study of chlorination. 1 kmol Sn (s) and kmol 2 $Cl_2$ (g) were calculated. The reaction has a conversion close to 100% from ambient temperature to 740° C. Table 2 presents the thermodynamic data of chlorination of tin at different temperatures.

TABLE 2

Tin chlorination thermodynamic data for different temperatures
Sn + 2Cl2(g) = SnCl4(g)

| T C | deltaH kcal | deltaS cal/K | deltaG kcal | K | Log(K) |
|---|---|---|---|---|---|
| 0.000 | −114.376 | −31.251 | −105.840 | 4.900E+084 | 84.690 |
| 100.000 | −114.295 | −30.999 | −102.728 | 1.484E+060 | 60.171 |
| 200.000 | −114.231 | −30.846 | −99.636 | 1.062E+046 | 46.026 |
| 300.000 | −115.884 | −34.124 | −96.326 | 5.411E+036 | 36.733 |
| 400.000 | −115.792 | −33.976 | −92.921 | 1.482E+030 | 30.171 |
| 500.000 | −115.691 | −33.837 | −89.530 | 2.042E+025 | 25.310 |
| 600.000 | −115.588 | −33.712 | −86.153 | 3.680E+021 | 21.566 |
| 700.000 | −115.486 | −33.601 | −82.787 | 3.925E+018 | 18.594 |
| 800.000 | −115.386 | −33.503 | −79.432 | 1.506E+016 | 16.178 |
| 900.000 | −115.290 | −33.417 | −76.086 | 1.498E+014 | 14.176 |
| 1000.000 | −115.198 | −33.342 | −72.748 | 3.084E+012 | 12.489 |

Thus, the only reagents that need to be continually provided to this industrial production system are metallic tin, atmospheric air and water, substances much cheaper than those used in other synthesis methods.

The low temperature requirements for the $SnO_2$ synthesis and the energy reuse in order to vaporize the water also provides advantages over other methods as well.

Those skilled in the art will appreciate the fact that the process object of the present invention applied to the production of nanoparticles, preferably nanoparticles of $SnO_2$, has industrial reproducibility, and provides several advantages over other synthesis methods. The benefits of reduced temperature and time required for the reaction is generally applicable to other gaseous reactions, also encompassed by the present invention.

What is claimed is:
1. A nanoparticle synthesis reactor comprising:
a) a reactor inlet;
b) a tubular section in which one of at least two reactants flows axially;
c) a gas distributor surrounding the tubular section, the gas distributor comprising a distributor inlet, a circular shape, cylindrical baffles providing flow canals, and orifices surrounding the tubular section of the reactor; and d) a powder collector, wherein the gas distributor provides an optimized radial interaction among reactant flows through a curtain of at least one of the reactants, providing kinetic enhancement of the following reaction:

$$A_{(g)} + B_{(g)} \rightarrow C_{(s)} + D_{(g)}.$$

2. The reactor according to claim 1, wherein:

a first of the reactants flows axially through the tubular section; and a second of the reactants enters the gas distributor through the distributor inlet, wherein the second reactant is redirected by the canals provided by the cylindrical baffles and then flows through the orifices that surround the tubular section, meeting the first reactant flow radially, synthesizing nanoparticles.

3. The reactor according to claim 1, wherein:

$A_{(g)}$ is $SnCl_{4(g)}$;
$B_{(g)}$ is $H_2O_{(g)}$;
$C_{(s)}$ is $SnO_{2(s)}$;
$D_{(g)}$ is $HCl_{(g)}$; and
$SnO_{2(s)}$ is in the form of tin dioxide nanoparticles.

4. The reactor according to claim 3, wherein the reactor maintains the reaction temperature at approximately 200° C.

5. The reactor according to claim 1, wherein the reactor provides particle size reduction of the synthesized nanoparticles and optimization of at least one of reaction conversion, reaction temperature, and reaction time.

6. The reactor according to claim 1, wherein the reactor provides particle size reduction of the synthesized nanoparticles and optimization of at least one of reaction conversion, reaction temperature, and reaction time.

7. A nanoparticle synthesis reactor comprising:

a) a reactor inlet;

b) a tubular section in which one of at least two reactant gases flows axially;

c) a gas distributor surrounding the tubular section, the gas distributor comprising a distributor inlet, a circular shape, cylindrical baffles, and orifices surrounding the tubular section of the reactor; and d) a powder collector, wherein the gas distributor provides an optimized radial interaction among reactant flows through a curtain of at least one of the reactant gases, providing kinetic enhancement of the following reaction:

$$A_{(g)} + B_{(g)} \rightarrow C_{(s)} + D_{(g)}.$$

8. The reactor according to claim 7, wherein:

a first of the reactant gases flows axially through the tubular section; and a second of the reactant gases enters the gas distributor through the distributor inlet, wherein the second reactant gas is redirected by the cylindrical baffles and then flows through the orifices that surround the tubular section, meeting the first reactant gas flow radially, synthesizing nanoparticles.

9. The reactor according to claim 7, wherein:

$A_{(g)}$ is $SnCl_{4(g)}$;
$B_{(g)}$ is $H_2O_{(g)}$;
$C_{(s)}$ is $SnO_{2(s)}$;
$D_{(g)}$ is $HCl_{(g)}$; and
$SnO_{2(s)}$ is in the form of tin dioxide nanoparticles.

10. The reactor according to claim 9, wherein the reactor maintains the reaction temperature approximately 200° C.

\* \* \* \* \*